Feb. 2, 1960 P. M. THOMPSON 2,923,894

DIODE RING CIRCUIT

Filed Feb. 2, 1959

INVENTOR
PHILIP M. THOMPSON
BY Smart & Biggar
ATTORNEYS

United States Patent Office 2,923,894

Patented Feb. 2, 1960

2,923,894

DIODE RING CIRCUIT

Philip M. Thompson, Cumberland, Ontario, Canada, assignor to Her Majesty the Queen in right of Canada, as represented by the Minister of National Defence Application February 2, 1959, Serial No. 790,667

1 Claim. (Cl. 332—47)

Figure 1:
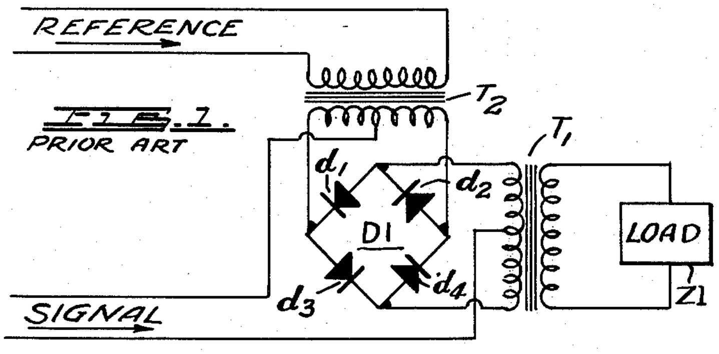
Figure 2:
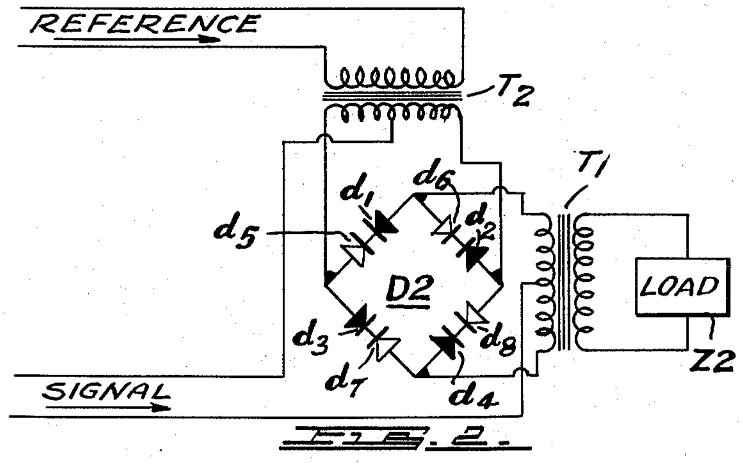
Figures 3, 4:
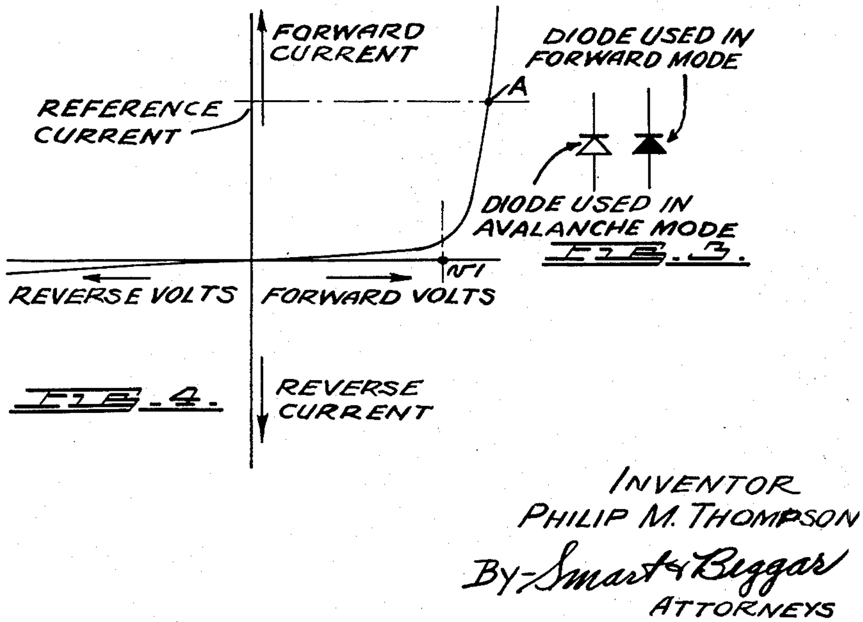

The invention relates to modulation and detection apparatus of the diode ring type and is described below with reference to the accompanying drawings in which:

Figure 1 is a schematic circuit diagram of modulation and detection apparatus in accordance with the prior art, Figure 2 is a schematic circuit diagram of modulation and detection apparatus in accordance with the present invention, Figure 3 shows the diode symbols used in Figures 1 and 2, and Figure 4 is a graph of the current-voltage characteristic of each pair of the diodes shown in Figure 2.

Figure 1 shows the circuit of a conventional diode ring modulator of the type which can be used as a switch controlling signal polarity, as a phase sensitive rectifier, or as a suppressed carrier modulator. In the circuit of Figure 1 a load Z1 is supplied current through a transformer T1 connected to a diode ring D1. Another transformer T2 is connected between the other set of terminals of the diode ring D1 and a source of reference current. Signal current is supplied to the diode ring D1 through the centre tap connections of the transformers T1 and T2. Assuming that the waveform of the reference current is a square wave and that both the reference current and the signal current are supplied from infinite impedance sources while the load Z1 is a zero impedance load, then the operation of the circuit is that of a simple switch.

If both input currents to the diode ring D1 are supplied from constant current sources with the reference current being the larger current, then the reference current by itself will drive one pair of diodes *d1d2* (or *d3d4*) into conduction, and the alternate pair *d3d4* (or *d1d2*) will be biased to cut off by the forward voltage generated across the conducting pair of diodes. It follows that any signal current injected into the centre taps of the windings of the transformers T1 and T2 can flow in only one-half of the centre-tapped winding of the transformer T1 at a time. Thus, when the rectifiers *d1d2* are conducting the signal current flows through the upper half of the primary winding of the transformer T1. The current flowing in the upper half of the primary of the transformer T1 causes current to be transferred to the load Z1. When the diodes *d3d4* are conducting the signal current flows through the lower half of the primary of the transformer T1. Accordingly, it may be seen that the diodes in the diode ring D1 perform a simple switching action between the halves of the primary winding of the transformer T1, as determined by the reference current. This switching action cannot be disturbed by the sense of the signal current nor by its magnitude, for by definition the maximum value of the signal current is insufficient to overcome the reference current. It follows that while the conducting pair of diodes is biased in a forward direction the non-conducting pair of diodes receives reverse bias when there is no voltage across the load. If the transformers T1 and T2 are lossless and if the reverse conduction of the cut-off diodes is zero, the whole signal current is transferred without loss to the output circuit. Thus, the diodes act as ideal switches which simply route the signal current under control of the reference current. However, the cut-off diodes do, in fact, pass a small current under the influence of the reverse voltage which is impressed on them by the voltages across the conducting diodes. This is the main source of unbalance in the modulator circuit.

In a practical system the input and output impedances must necessarily depart from the ideal of infinite and zero but it is not difficult to make the source impedances for the reference and signal currents several orders of magnitude greater than the output impedance and, if this is done, the performance is not degraded significantly. It is important to take care that the voltage developed across the load is very low because it is reflected by the transformer T1 as a bias across the non-conducting diodes and it must not be permitted to cause them to conduct.

In the prior art ring modulator circuit just described, balance is obtained at the expense of efficiency for, as just shown, a voltage across the load interferes with the switching action of the diodes and therefore, in the prior art circuits the output must be current only. The result of voltage developed across the load is to create a forward bias across the pair of diodes which must remain switched off. The present inventor has discovered a way of avoiding this limitation by providing combinations of diodes in each of the arms of the diode ring which remain non-conducting even in the presence of a substantial forward voltage. According to the invention, a pair of diodes is used in each arm of the diode ring which requires a forward voltage of several volts to cause the pair of diodes to conduct. Each pair of diodes comprises a diode with a fairly low avalanche breakdown voltage in series with one with a much higher avalanche breakdown voltage connected in the manner shown in Figure 2. The same reference designations are used in Figure 2 as in Figure 1 for the same components.

The terms "avalanche breakdown voltage" and "avalanche mode" are used in this specification in their usual meanings in the art to denote the voltage and the direction of current conduction respectively, for the sharp increase in current which occurs at a predetermined voltage in a diode subjected to reverse voltage, i.e., a voltage of opposite polarity to that required to produce forward current flow in the diode. Diodes are available for a range of avalanche breakdown voltages, for example silicon diodes which may have an avalanche breakdown voltage of, say, 10 volts.

The circuit according to the invention, shown in Figure 2, has a four terminal diode ring D2 comprising pairs of diodes *d1d5*, *d2d6*, *d3d7* and *d4d8* connected between its terminals. The diodes are connected with polarities such that current can flow around the diode ring in one direction in avalanche mode through the diodes *d5d6d7* and *d8* and in forward mode through the diodes *d1d2d3* and *d4*. It is essential that the forward mode diodes *d1d2d3* and *d4* have higher avalanche breakdown voltages than the avalanche mode diodes *d5d6d7* and *d8*.

Figure 4 shows a graph of the current-voltage characteristic of each pair of diodes *d1d5*, *d2d6*, *d3d7*, and *d4d8* of the diode ring D2 of Figure 2. The circuit shown in Figure 2 acts as a switch in a similar way to the circuit shown in Figure 1 but the switched-off diodes remain non-conducting until the voltage across them, due to voltage across the load Z2 reaches the value $v1$ as shown in Figure 4. When the diodes are turned on they exhibit a resistance, as indicated by the slope of the curve at A. The circuit of Figure 2 also must be driven from circuits of much higher impedance than the load but the load impedance modified by the turns ratio of the transformer T1 can be made to the optimum load impedance of the amplifier or other type of equipment which supplies the signal current. Amplifiers with output impedances several orders higher than their optimum load impedances may be designed using conventional practice and with transistors this is particularly convenient due to their high collector impedance. The efficiency of the modulator in accordance with the invention, as shown in Figure 2, can be made to approach 100%, for example, 90% is a practical figure, because the forward impedances of the pairs of diodes and the secondary resistance of the transformers can total a much lower resistance than that of the load.

The circuits have been described with reference to semiconductor diodes but other types could be used; for example, the diodes which are used in the forward mode could be conventional thermionic diodes and the diodes used in the avalanche mode could be gas regulator tubes.

What I claim as my invention is:

Modulation and detection apparatus of the diode ring type comprising a diode ring having four terminal connections, a pair of diodes connected in series between each of said terminals and each of the next adjacent terminals around the ring with polarities such as to permit current flow around the ring in one direction in avalanche mode through one diode of each pair and in forward mode through the other diode of each pair, the forward mode diodes having higher avalanche breakdown voltages than the avalanche mode diodes.

No references cited.